United States Patent
Korta

(10) Patent No.: US 11,421,948 B2
(45) Date of Patent: Aug. 23, 2022

(54) PASSIVE FLOW DIVIDER AND LIQUID COOLING SYSTEM COMPRISING THE SAME

(71) Applicant: Aptiv Technologies Limited, St. Michael (BB)

(72) Inventor: Jakub Korta, Cracow (PL)

(73) Assignee: Aptiv Technologies Limited, St. Michael (BB)

( * ) Notice: Subject to any disclaimer, the term of this patent is extended or adjusted under 35 U.S.C. 154(b) by 35 days.

(21) Appl. No.: 17/145,144

(22) Filed: Jan. 8, 2021

(65) Prior Publication Data
US 2021/0231393 A1     Jul. 29, 2021

(30) Foreign Application Priority Data

Jan. 24, 2020  (EP) .................................... 20153690

(51) Int. Cl.
    *F28F 13/06*     (2006.01)
    *F28F 1/00*     (2006.01)

(52) U.S. Cl.
    CPC ................ *F28F 13/06* (2013.01); *F28F 1/00* (2013.01)

(58) Field of Classification Search
    CPC .. F28F 13/06; F28F 1/00; F28F 9/0253; F28F 9/0268; F28F 9/0204; F28F 9/0265; F28F 9/026; F28D 2250/104; F24D 2220/0214; F24D 2220/02
    USPC ................................................. 165/139, 126
See application file for complete search history.

(56) References Cited

U.S. PATENT DOCUMENTS

| 2,099,186 | A | | 11/1937 | Anderegg |
| 2,126,364 | A | | 8/1938 | Ernst |
| 2,196,858 | A | | 4/1940 | Gleason |
| 2,240,203 | A | * | 4/1941 | Armacost ............... F28D 9/00 |
| | | | | 165/DIG. 104 |
| 2,432,859 | A | | 12/1947 | Carter |
| 4,509,587 | A | | 4/1985 | Clark et al. |

(Continued)

FOREIGN PATENT DOCUMENTS

| CN | 101484742 A | 7/2009 |
| CN | 101691981 A | 4/2010 |

(Continued)

OTHER PUBLICATIONS

"Extended European Search Report", EP Application No. 20153690.1, dated Jul. 6, 2020, 9 pages.

(Continued)

*Primary Examiner* — Tho V Duong
(74) *Attorney, Agent, or Firm* — Sawtooth Patent Group PLLC

(57) ABSTRACT

A passive flow divider for providing outflows is described. The passive flow divider includes at least one inlet for an inflow and a plurality of outlets for said outflows, a housing enclosing a main partition that separates an intake space and a discharge space, a common end located at an interface between the intake space and the discharge space, and a baffle arranged in the intake space between said inlet and the common end. The passive flow divider further includes a plurality of distribution chambers arranged in the discharge space and adjacent to each other, each distribution chamber being arranged to lead an outflow from the common end to one of the outlets.

20 Claims, 4 Drawing Sheets

(56) References Cited

U.S. PATENT DOCUMENTS

| | | | |
|---|---|---|---|
| 4,593,539 A * | 6/1986 | Humpolik | F25B 41/45 62/504 |
| 5,841,634 A * | 11/1998 | Visser | H05K 7/20927 361/689 |
| 2005/0022982 A1* | 2/2005 | Dilley | F28F 9/0265 165/148 |
| 2005/0211802 A1 | 9/2005 | Newton | |
| 2005/0262872 A1* | 12/2005 | Sacks | F28F 9/026 62/500 |
| 2010/0031698 A1* | 2/2010 | Higashiyama | F28D 1/05391 62/526 |
| 2015/0007604 A1* | 1/2015 | Hu | F25B 49/025 165/158 |
| 2015/0136366 A1* | 5/2015 | Fukui | F28F 13/06 165/148 |
| 2017/0328653 A1* | 11/2017 | O'Coin | F25B 39/00 |
| 2018/0066536 A1* | 3/2018 | Scholtes | F01D 25/02 |

FOREIGN PATENT DOCUMENTS

| | | |
|---|---|---|
| CN | 202304507 | 7/2012 |
| CN | 103712509 A | 4/2014 |
| CN | 110234951 A | 9/2019 |
| DE | 19719250 | 11/1998 |
| EP | 3301394 | 4/2018 |
| GB | 730347 | 5/1955 |
| WO | 2009022575 | 2/2009 |

OTHER PUBLICATIONS

"Foreign Office Action", CN Application No. 202110088662.9, dated Jun. 20, 2022, 14 pages.

* cited by examiner

PASSIVE FLOW DIVIDER AND LIQUID COOLING SYSTEM COMPRISING THE SAME

CROSS-REFERENCE TO RELATED APPLICATION

This application claims priority to European Patent Application Number 20153690.1, filed Jan. 24, 2020, the disclosure of which is hereby incorporated by reference in its entirety herein.

TECHNICAL FIELD

The present disclosure relates to the field of liquid distribution systems which may be designed to be arranged in a heat exchanger used in the automotive sector for instance. More specifically, the present disclosure relates to a passive flow divider and a liquid cooling system comprising the same.

BACKGROUND

Heat exchangers or liquid cooling systems may be equipped with multiple heat exchange plates operating in parallel for optimizing the efficiency of the heat exchange. To supply these heat exchange plates, initial cooling liquid stream needs to be divided into a number of sub-streams, each supplying an individual plate. In some cases, it is important that each plate is provided with the same coolant volume flow rate to ensure equal cooling performances for each plate.

To this end, the flow rate of the initial liquid stream should be distributed into equal sub-flow rates. Such a goal can be reached using active valve control system involving specific precision mechanisms with movable components such as spool flow dividers or pumps. However, the use of such systems generates additional costs, increases complexity of the flow divider as well as the heat exchanger, which may result in lower reliability while requiring more maintenance.

To overcome these drawbacks, there are simpler flow dividers, referred as to passive flow dividers, which have the benefit of having no moving part. An example of such dividers may be made from a rectangular hollow metal body providing several ways thanks to thread fitting holes arranged on the some of the sides of the body. This device is designed to provide different flowing ways and uses fitting plugs to close some unwanted holes. Unfortunately, devices of such a type do not provide uniform flow rates through their holes or outlets.

Besides the outflow uniformity, a significant constraint for such cooling systems, especially in the automotive sector, relates to the mounting space availability which is drastically limited by the other surrounding devices. Accordingly, to meet compactness requirements, flow dividers should also be as small as possible.

Accordingly there is a need for improving existing flow dividers and liquid cooling systems comprising the same in order to at least partially overcome the aforementioned issues and drawbacks.

SUMMARY

To address this concern, the present disclosure suggests, as a first aspect, a passive flow divider for providing outflows. This divider has: at least one inlet for an inflow and a plurality of outlets for said outflows, a housing enclosing an intake space and a discharge space separated each other by a main partition, a common end located at an interface between the intake space and the discharge space, the intake space comprising a baffle arranged between said inlet and the common end, the discharge space comprising a plurality of distribution chambers adjacent to each other and each distribution chamber being arranged to lead one outflow from the common end to one of the outlets.

Thanks to the above solution, the outflows at the outlets are advantageously (almost) uniform, both in terms of flow rate and flow regime, while avoiding the presence of moving parts. Accordingly, the present disclosure suggests a reliable and robust solution, further provided with limited sizes to meet the restrictive size requirements usually well known in the automotive field among others.

According to one embodiment, the outlets are parallel to each other. Preferably, the outlets are located at a same distance from the common end.

According to another embodiment, the distribution chambers are identical and/or parallel to each other. Preferably, the distribution chambers are coplanar.

According to one embodiment, at least two adjacent distribution chambers are separated each other by a splitting partition. Preferably, the splitting partition is impermeable.

According to another embodiment, the main partition is impermeable.

Preferably, the inlet and the outlets form a symmetrical layout.

According to one embodiment, the inlet is located opposite the common end.

According to one embodiment, the baffle is an openwork baffle comprising cutout having sizes and form that depend on operating conditions and/or on a liquid type used as inflow. Preferably, the baffle is located at a position, relative to the inlet or to the common end, which depends on the operating conditions and/or on the liquid type used as inflow.

According to a preferred embodiment, the housing is made of a front part and a rear part sandwiching the main partition.

In a further embodiment, at least one of the inlet and outlets has a fitting.

According to a second aspect, the present disclosure also relates to a heat exchanger comprising a passive flow divider complying with any of the embodiments or variants disclosed therein.

Other embodiments and advantages will be disclosed hereafter in the detailed description.

BRIEF DESCRIPTION OF THE DRAWINGS

The solution and the embodiments suggested in the present disclosure should be taken as non-limitative examples and will be better understood with reference to the attached Figures in which:

Referring to FIG. 1, the latter shows an example of a local environment in which the passive flow divider 1 of the present disclosure may be arranged. In the example of this Figure, the aforementioned local environment relates to a liquid cooling system 2. In addition to the passive flow divider 1, the liquid cooling system 2 of this example has a heat exchanger 3, a plurality of cold plates 4 and a flow collector 5. Other elements such as auxiliary devices may be added to such a liquid cooling system, especially to the heat exchanger 3.

Figure 1:
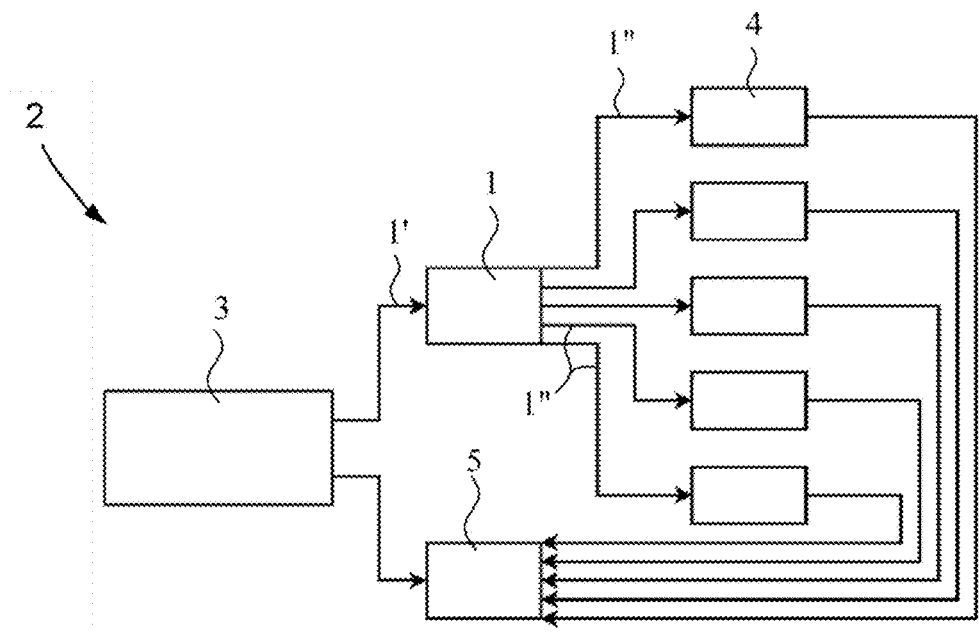
FIG. 1 is a flow chart showing an example of a local environment in which the passive flow divider of the present solution may be arranged.

As schematically depicted in FIG. 1, the passive flow divider 1 is designed to provide a plurality of outflows 1" from at least one inflow 1' coming e.g. from the heat exchanger 3 or from an auxiliary device. Each outflow 1" supplies another entity such as one of the cold plates 4 in the example of FIG. 1. A return path leads the cooling liquid from each cold plate 4 to a flow collector 5.

In some cases, each cold plate should be supported with the same coolant volume flow rate, thus resulting in equal cooling efficiency within these entities. In order to fulfill this requirement, flow divider 1 needs to provide uniform flow, or almost uniform flow, in all of its outlets. To this end, the present solution discloses a passive flow divider 1, namely a divider which is free of any actuator, i.e. movable part. Such a divider will provide uniform volume flow on all the outlets as long as the entities, e.g. cold plates 4, connected thereto have similar flow conditions. Typically, these conditions will be met if the individual cold plates are identical.

Figures 2A, 2B:
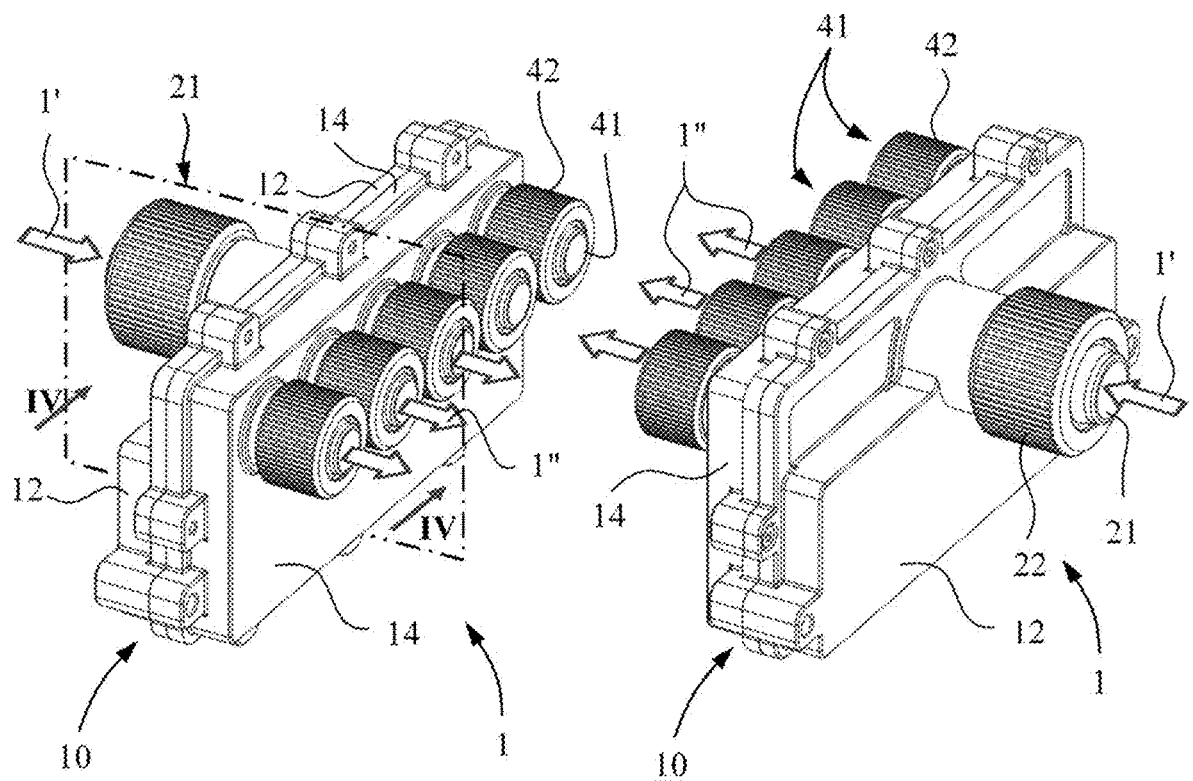
FIGS. 2a and 2b show respectively a front view and a rear view of the passive flow divider in perspective illustrations.
Figure 3:
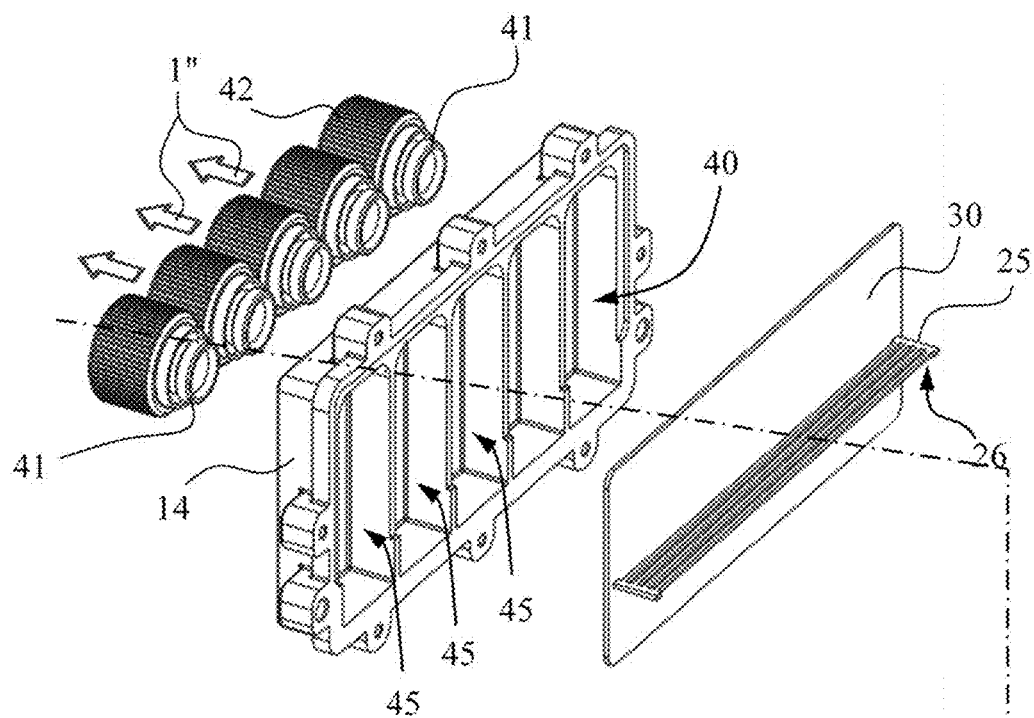
FIG. 3 is an exploded view of FIG. 2a, FIG. 4 is a vertical cross-sectional view according to the plan Iv-Iv of FIG. 2a, FIG. 5 is an oblique projection of FIG. 4, FIG. 6 relates to a bar graph showing the relationship between the maximum relative outflow differences and the inflow rates obtained for the passive flow divider of the present solution.
Figure 3:
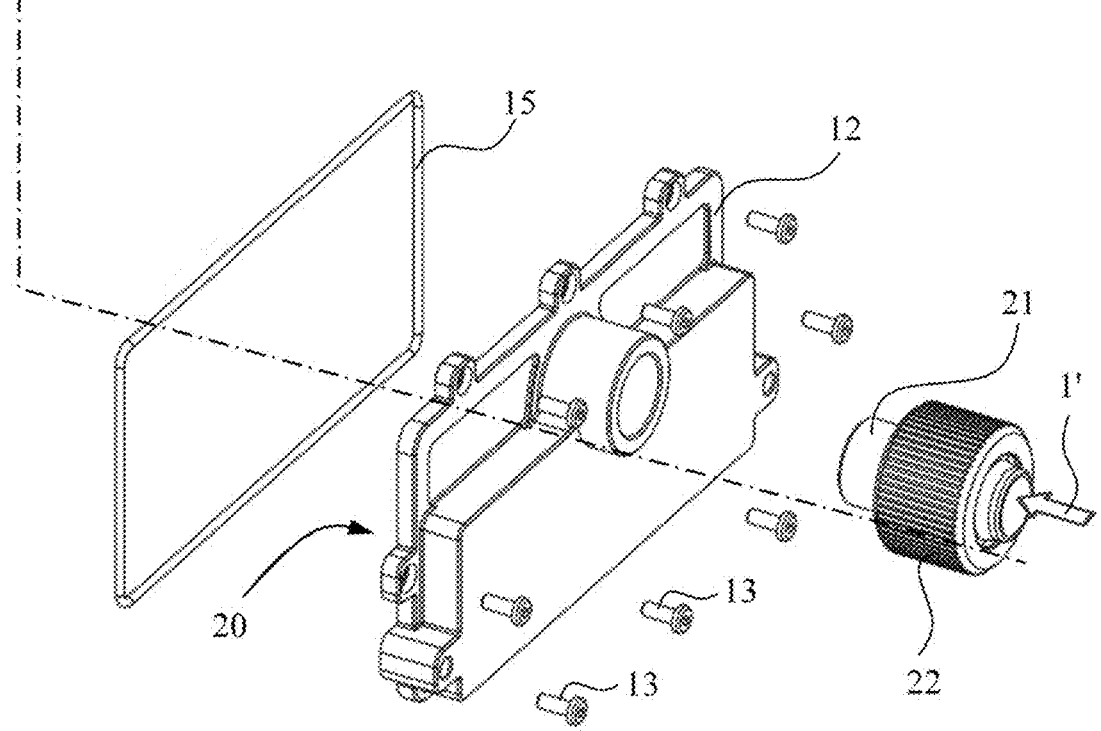

As shown in FIGS. 2a and 2b which provide a front and a rear perspective views of an example of one of the preferred passive flow divider 1 of the present disclosure, and as shown in FIG. 3 which is an exploded view of FIG. 2b, the passive flow divider 1 has a housing 10 provided with at least one inlet 21 for an inflow 1' and a plurality of outlets 41 for the outflows 1". More specifically, there is one inflow 1' for each inlet 21 and one outflow" for each outlet 41.

Figure 4:
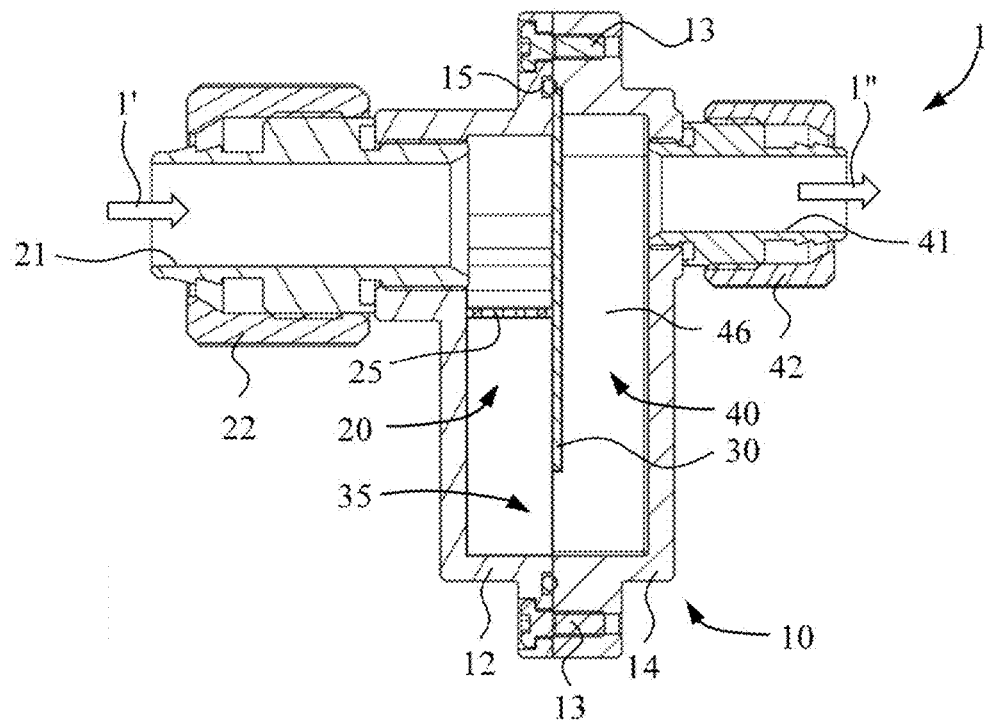

As better shown in FIG. 4, which is a vertical cross-sectional view according to the plan Iv-Iv of FIG. 2b, the housing 10 encloses an intake space 20 and a discharge space 40 which are separated each other by a main partition 30. At the interface between the intake space 20 and the discharge space 40, the passive flow divider 1, has a common end 35. Preferably, the common end 35 occupies the entire length and width of the intake and discharge spaces. As better shown in FIG. 5 which is a perspective view of FIG. 4, the intake space 20 has a baffle 25 arranged between the inlet 21 and the common end 35. The baffle 25 may be regarded as an openwork partition located within the intake space 20, across the inflow P. The discharge space 40 has a plurality of distribution chambers 45 adjacent to each other. Each of these distribution chambers 45 is arranged to lead one outflow 1" from the common end 35 to one of the outlets 41.

Thanks to this embodiment, the outflows 1" at the outlets 41 can advantageously be qualified as being uniform or almost uniform. This is especially due to the provision of an intake space 20 and an discharge space 40 linked each other at one end, namely at the common end 35 where the fluid can be mixed. This is also due to the provision and the position of the baffle 25, acting as a flow dispersion baffle, and due to the specificity of the plurality of distribution chambers 45 within the discharge space 40.

The intake space 20 form a channel for receiving and guiding the inflow 1' towards the baffle 25 and the common end 35. The main partition 30 prevents the inflow 1' from going directly to the outlets 41 from the inlet 21 by making the intake space 21 and the discharge space 41 substantially separated from each other. It also prevents the inflow 1' to interact directly with the outflow 1", so that the inlet stream cannot influence the outlet stream which can thus retain its uniformity acquired within the passive flow divider 1. The baffle 25, which preferably looks like a grate, allows the inlet stream to be advantageously dispersed throughout the intake space 20. The distribution chambers 45 allow to divide the flow in the discharge space 40 within a plurality of outflows 1", especially into a required number of uniform outlet streams, depending on the number of outlets 41 of the passive flow divider 1.

Advantageously, using a baffle 25 made from a grate also allows to improve the fluidization of the liquid by simultaneously dispersing and maintaining in suspension possible fine solid particles in the moving fluid. Thus, by improving the fluidization in the intake space 20, more specifically before the common end 35, it make possible to get a better homogenization of the inflow 1' before it reaches the distribution chambers 45. Such a feature further contribute to improve the flow distribution within the discharge space 40, helping thus to achieve identical flow rates through the outlets 4.

According to one embodiment, the outlets 41 are parallel to each other. Such a feature allows the passive flow divider 1 to have similar characteristics at each of its outlets 41, thus contributing to the uniformity of the outflows 1". Preferably, the outlets 41 are further identical.

Still preferably, the outlets 41 are located at a same distance from the common end 35. Accordingly, assuming that the outlets are located within a same plan (e.g. a horizontal plan), the common end 35 may be located within a plan which may be parallel to the plan of the outlets, so that all the distribution chambers 45 may have the same length between the common end 35 and the outlets 41.

According to a preferred embodiment, the distribution chambers 45 are parallel to each other. Preferably, they are further identical to each other.

According to another embodiment and as previously suggested, the distribution chamber 45 are coplanar, i.e. they are located in a same plan, preferably in a plan which is perpendicular to the body 10, especially perpendicular to the intake and discharge spaces.

Figure 5:
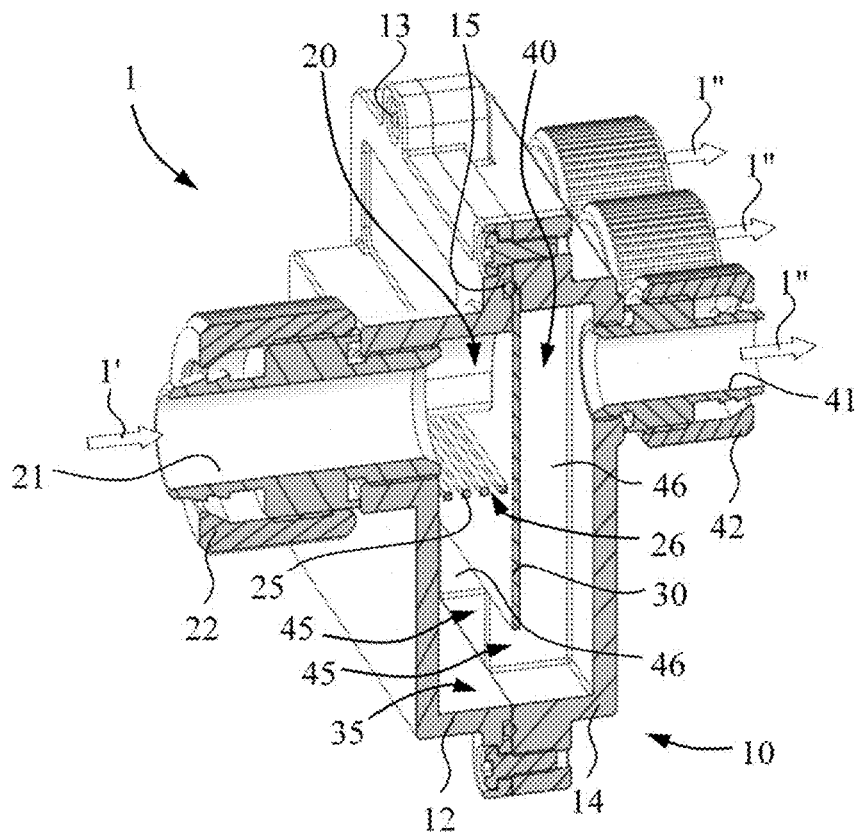

As better shown in FIG. 5, at least two adjacent distribution chambers 45 are separated each other by a splitting partition 46. Preferably, such a splitting partition is arranged between each pair of adjacent distribution chambers 45. Accordingly, if the discharge space 40 has e.g. five distribution chambers (i.e. five outlets), as shown in the example of FIGS. 2a-2b and 3, therefore four splitting partition 46 are arranged in the discharge space for separating the distribution chambers. Preferably, each of these splitting partitions 46 is impermeable, thus preventing from further mixing between the outlet streams flowing in the distribution chambers.

According to a preferred embodiment, the main partition 30 is impermeable, so that the inflow 1" is urged to flow towards the common end 35 before reaching to the discharge space and flowing into the distribution chambers 45.

According to another embodiment, the inlet 21 and the outlets 41 form a symmetrical layout, in particular according to a plan view (e.g. when the passive flow divider 1 is viewed from above or below). Thanks to this layout, the inlet 21 is arranged in a symmetric way with respect to the outlets 41, thus further contributing to provide a better distribution of the inflow 1' within the passive flow divider.

According to another preferred embodiment, the inlet 21 is located opposite the common end 35. Preferably, the outlets 41 are also located opposite the common end 35 and still preferably, the inlet 21 and the outlets 41 are located in a same plan or in two parallel plans which are preferably very close to each other, as shown in FIG. 4 for instance.

As better shown in FIG. 5, the baffle 25 is preferably an openwork baffle comprising cutouts 26, in particular longitudinal cutouts. The form and sizes of these cutouts 26 typically depend on operating conditions and/or on the liquid type used as inflow 1'. The liquid may refer to water, preferably brine or glycol water, e.g. water containing up to 50% glycol. Depending on the fluidity of the liquid, the openwork baffle may have other cutout shapes. For example, the baffle 25 may be made from a plate comprising a large number of openings, typically circular, square or rectangular openings. Alternatively, the baffle 25 may be made from a plate having a honeycomb-shaped structure.

Preferably, the baffle 25 is arranged perpendicularly to the main partition 30. Still preferably, the baffle 25 occupies the entire lengthwise cross-section of the intake space 20, especially the lengthwise cross-section which is perpendicular to the main partition. Such a perpendicular cross-section may be regarded as being horizontal with respect to the illustrations shown in the attached Figures. In this regard, the common end 35 is located at the bottom of the passive flow divider 1, whereas the inlet 21 and the outlets 41 are located at the upper part of this divider.

The aforementioned operating conditions may typically refer to the temperature of the liquid or to the ambient working temperature of the passive flow divider 1. These operating conditions may also relate to the orientation of the passive flow divider 1 in space, in particular its orientation with respect to the horizontal plan.

Preferably, the baffle 25 is located at a position, relative to the inlet 21 or the common end 35, which depends on the aforementioned operating conditions and/or on the liquid type used as inflow P. For example, depending on the temperature or the viscosity of the liquid flowing through the divider 1 under normal operating conditions, the baffle 25 may be arranged at a greater or lesser distance from the common end 35.

According to one embodiment, the baffle 25 is located closer to the mouth or inlet of the inflow 1' into the intake space 20 than to the common end 35. According to another embodiment, the baffle 25 is located halfway between these two points. According to a further embodiment, the baffle 25 is located closer to the common end 35 than to the aforementioned mouth. For example, the baffle 25 may be located at the end of the main partition 30 which is next to the common end 35. Depending on the inflow rate and specific cutout shapes of the baffle 25, the latter could be positioned at a position, relative to the inlet 21 or the common end 35, which allows to have a small amount or height of fluid above the baffle. Thanks to such a fluid layer above the baffle, the latter would also able to provide a first homogeneous distribution of the fluid before the common end 35.

As better shown in FIGS. 3, 4 and 5, the housing 10 is made of a front part 14 and a rear part 12 sandwiching the main partition 30. These parts may be assembled one to the other using assembly means which may screws 13, as depicted in the embodiment presented through these Figures. To ensure the sealing of the housing 10, a seal 15 may be arranged at the interface between these two parts 12, 14. Such a seal 15 may be located e.g. in a groove in the rear part 12 of the body 10, as shown in FIGS. 4 and 5.

The passive flow divider 1 may further includes fittings 22, 42 for the respective inlet 21 and outlets 41. Preferably, at least one of the inlet 21 and outlets 41 has a fitting 22, 42.

Those fittings 22, 42 may typically be designed to connect inlet and outlets hoses to the passive flow divider 1.

The compactness of the body 10, especially of the intake space 20 and the discharge space 40, allows to obtain a very space-saving flow divider 1 while being lightweight, especially if it is made of e.g. aluminum, magnesium or any other lightweight material or alloy. The fact that this flow divider 1 is a passive flow divider, i.e. it is devoid of any moving part such as an actuator, also helps to get a very compact device having small dimensions. Accordingly, such a passive flow divider 1 becomes particularly appropriate for being arranged in confined spaces, such a those typically encountered in automotive industry for instance.

Figure 6:
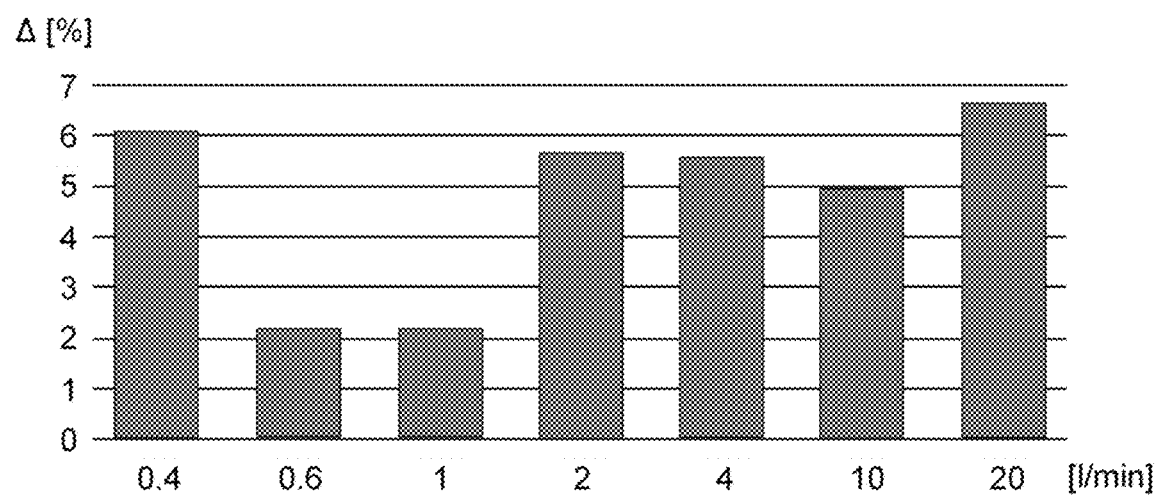

Referring now to FIG. 6, it relates to bar graphs showing the relationship between (i) the maximum relative outflow differences and (ii) the inflow rates. In other words, on the Y-axis, the scale shows the maximum relative difference (percent [%]) between the highest and the lowest volume flow on the outlets of the passive flow divider, whereas on the X-axis, the scale ([l/min]) shows several inflows rates in a range from 0.4 to 20 l/min.

The relative outflow difference $\Delta$ on the Y-axis is calculated from the following formula: $\Delta=$(Max outflow−Min outflow)/Max outflow. Since this difference is relative, it can be provided in percent [%]. This relative difference $\Delta$ has been calculated for seven inflow values extending within the aforementioned range from 0.4 to 20 l/min. It should be noted that the X-axis scale is non-linear, contrary to the Y-axis scale. The cooling liquid used as inflow 1' in the simulation results of FIG. 6 is a water-glycol mixture (50:50) having a temperature of 20° C.

It should be noted that, thanks to the passive flow divider 1 of the present solution, this relative difference is advantageously almost constant (5.0 to 5.5%) from a flow rate comprised between 2 l/min and 10 l/min, and slightly increases up to 6.5% between 10 l/min to 20 l/min. It should be noted that these observations result from simulations made with the aforementioned cooling liquid in a steady state conditions and that the values provided in FIG. 6 correspond to averaged values over time.

From the values shown in FIG. 6, it is noticeable that the passive flow divider 1 of the present solution is much more efficient than most of the known passive dividers of the prior art, wile being able to provide uniform (or almost uniform) flow rates at the outlets 41. Moreover, since the flow divider 1 is free of any actuator, it remains an economic flow divider 1 providing a compact design.

In a second aspect, the present solution relates to a liquid cooling system comprising a passive flow divider 1 according to any of the embodiments or variants disclosed therein, or according to any possible combination of such embodiments. Such a liquid cooling system may be an arrangement designed for an automotive electronic control unit (ECU). Preferably and as shown in FIG. 1, this system 2 is an advanced liquid cooling system equipped with a plurality of cold plates 4 operating in parallel. Still preferably, the liquid used in this system is a water-glycol mixture. Nevertheless, other liquids may be used, such as water or oil for example. According to another embodiment, the system 2 relates to a heat exchanger, preferably a heat exchanger for automotive industry. Such a heat exchanger may be also convenient for other fields of implementation, for example for computer cooling systems such as personal computers, servers, supercomputers, data-centers and the like.

Although an overview of the inventive subject matter has been described with reference to specific example embodiments, various modifications and changes may be made to these embodiments without departing from the broader spirit and scope of embodiments of the solution disclosed in the present description.

What is claimed is:

1. A passive flow divider for providing outflows, the passive flow divider comprising:
   at least one inlet for an inflow and a plurality of outlets for said outflows;
   a housing enclosing a main partition that separates an intake space and a discharge space;
   a common end located at an interface between the intake space and the discharge space;
   a baffle arranged in the intake space between said inlet and the common end, the baffle being arranged perpendicular to the main partition and occupying a lengthwise cross-section of the intake space that is perpendicular to the main partition, the baffle comprising longitudinal cutouts; and
   a plurality of distribution chambers arranged in the discharge space and adjacent to each other, each of the distribution chambers being arranged to lead an outflow from the common end to one of the outlets.

2. The passive flow divider of claim 1, wherein the outlets are parallel to each other.

3. The passive flow divider of claim 1, wherein the outlets are located at a same distance from the common end.

4. The passive flow divider of claim 1, wherein the distribution chambers are both identical and parallel to each other.

5. The passive flow divider of claim 1, wherein the distribution chambers are coplanar.

6. The passive flow divider of claim 1, wherein two adjacent of the distribution chambers are separated by a splitting partition.

7. The passive flow divider of claim 6, wherein the splitting partition is impermeable.

8. The passive flow divider of claim 1, wherein the main partition is impermeable.

9. The passive flow divider of claim 1, wherein the at least one inlet and the plurality of outlets form a symmetrical layout.

10. The passive flow divider of claim 1, wherein the at least one inlet is located opposite the common end.

11. The passive flow divider of claim 1, wherein sizes of the longitudinal cutouts of the baffle depend on operating conditions of the inflow.

12. The passive flow divider of claim 11, wherein the baffle is located at a position, relative to the inlet or the common end, that depends on the operating conditions of the inflow.

13. The passive flow divider of claim 1, wherein the longitudinal cutouts of the baffle are parallel to the main partition and have sizes that depend on a liquid type used as the inflow.

14. The passive flow divider of claim 13, wherein the baffle is located at a position, relative to the inlet or the common end, that depends on the liquid type used as the inflow.

15. The passive flow divider of claim 1, wherein the housing is made of a front part and a rear part that sandwich the main partition.

16. The passive flow divider of claim 1, wherein the at least one inlet and one of the plurality of outlets comprise a fitting.

17. A liquid cooling system comprising:
   a passive flow divider, the passive flow divider comprising:
      at least one inlet for an inflow and a plurality of outlets for providing outflows;
      a housing enclosing a main partition that separates an intake space and a discharge space;
      a common end located at an interface between the intake space and the discharge space;
      a baffle arranged in the intake space between said inlet and the common end, the baffle being arranged perpendicular to the main partition and occupying a lengthwise cross-section of the intake space that is perpendicular to the main partition, the baffle comprising longitudinal cutouts; and
      a plurality of distribution chambers arranged in the discharge space and adjacent to each other, each of the distribution chambers being arranged to lead an outflow from the common end to one of the outlets.

18. The liquid cooling system of claim 17, wherein the outlets are parallel to each other.

19. The liquid cooling system of claim 17, wherein the outlets are located at a same distance from the common end.

20. The liquid cooling system of claim 17, wherein the distribution chambers are both identical and parallel to each other.

* * * * *